(12) United States Patent
Hoffmann

(10) Patent No.: US 11,417,483 B2
(45) Date of Patent: Aug. 16, 2022

(54) POWER CONTACTOR AND METHOD FOR PRODUCING A HOUSING BODY FOR THE POWER CONTACTOR

(71) Applicant: TDK Electronics AG, Munich (DE)

(72) Inventor: Robert Hoffmann, Berlin (DE)

(73) Assignee: TDK ELECTRONICS AG, Munich (DE)

(*) Notice: Subject to any disclaimer, the term of this patent is extended or adjusted under 35 U.S.C. 154(b) by 308 days.

(21) Appl. No.: 16/347,162

(22) PCT Filed: Nov. 7, 2017

(86) PCT No.: PCT/EP2017/078441
§ 371 (c)(1),
(2) Date: May 2, 2019

(87) PCT Pub. No.: WO2018/087075
PCT Pub. Date: May 17, 2018

(65) Prior Publication Data
US 2020/0058458 A1    Feb. 20, 2020

(30) Foreign Application Priority Data
Nov. 8, 2016  (DE) .......................... 102016121345.4

(51) Int. Cl.
*H01H 50/54*   (2006.01)
*H01H 50/02*   (2006.01)
(Continued)

(52) U.S. Cl.
CPC .......... *H01H 50/023* (2013.01); *C04B 35/00* (2013.01); *C04B 37/02* (2013.01);
(Continued)

(58) Field of Classification Search
CPC .... H01H 50/023; H01H 50/18; H01H 50/546; H01H 11/00628; H01H 51/29;
(Continued)

(56) References Cited

U.S. PATENT DOCUMENTS 5,519,370 A * 5/1996 Perreira ................. H01H 3/001
218/123
5,912,604 A * 6/1999 Harvey .............. H01H 33/6662
335/9

(Continued)

FOREIGN PATENT DOCUMENTS

CN           1919517 A     2/2007
CN         101593638 A    12/2009
(Continued)

*Primary Examiner* — Shawki S Ismail
*Assistant Examiner* — Lisa N Homza
(74) *Attorney, Agent, or Firm* — Slater Matsil, LLP

(57) ABSTRACT

A power contactor and a method for producing a housing body for a power contactor are disclosed. In an embodiment a power contactor includes a first electrical contact, a second electrical contact, a switch element configured to provide an opened position and a closed position, wherein the switch element, in the closed position, contacts the first electrical contact and the second electrical contact with one another, and wherein the first electrical contact and the second electric contact are insulated from one another when the switch element is in the opened position and at least one temperature sensor integrated into the power contactor, wherein the sensor is configured to detect a temperature of the power contactor in a pre-defined distance from the first electrical contact and/or the second electrical contact.

16 Claims, 3 Drawing Sheets

(51) Int. Cl.
*C04B 35/00* (2006.01)
*C04B 37/02* (2006.01)
*H01H 11/00* (2006.01)
*H01H 50/18* (2006.01)
*H01H 51/29* (2006.01)

(52) U.S. Cl.
CPC ........ *H01H 11/0062* (2013.01); *H01H 50/18* (2013.01); *H01H 50/546* (2013.01); *H01H 51/29* (2013.01); *C04B 2235/9607* (2013.01); *H01H 2011/0068* (2013.01)

(58) Field of Classification Search
CPC . H01H 2011/0068; C04B 35/00; C04B 37/02; C04B 2235/9607
USPC ............................................................ 335/2
See application file for complete search history.

(56) References Cited

U.S. PATENT DOCUMENTS

| | | | |
|---|---|---|---|
| 10,790,105 B1* | 9/2020 | Cho | H01H 36/00 |
| 2006/0261916 A1* | 11/2006 | Molyneux | H01H 50/023 |
| | | | 335/128 |
| 2007/0001791 A1* | 1/2007 | Fischer | H01H 73/08 |
| | | | 335/202 |
| 2007/0039935 A1* | 2/2007 | Justice | H01H 50/546 |
| | | | 219/137.71 |
| 2011/0221548 A1* | 9/2011 | Yoshihara | H01H 51/29 |
| | | | 335/185 |
| 2014/0076923 A1* | 3/2014 | Clark | G01F 23/26 |
| | | | 222/23 |
| 2015/0187518 A1* | 7/2015 | Molyneux | H01H 50/546 |
| | | | 335/154 |
| 2016/0133410 A1* | 5/2016 | Bock | H01H 47/325 |
| | | | 361/160 |
| 2016/0133413 A1* | 5/2016 | Bock | H01H 50/026 |
| | | | 361/142 |
| 2017/0148596 A1* | 5/2017 | Ozaki | H01H 51/065 |
| 2018/0286614 A1* | 10/2018 | Morikawa | H01R 9/16 |
| 2020/0373111 A1* | 11/2020 | Zhong | H01H 50/02 |

FOREIGN PATENT DOCUMENTS

| | | |
|---|---|---|
| CN | 201608120 U | 10/2010 |
| CN | 204067227 U | 12/2014 |
| CN | 204286617 U | 4/2015 |
| EP | 1754563 A1 | 2/2007 |
| EP | 2975626 A1 | 1/2016 |
| JP | S5610252 U | 1/1981 |
| JP | S57123968 U | 8/1982 |
| JP | H10134691 A | 5/1998 |
| JP | 2016046007 A | 4/2016 |

* cited by examiner

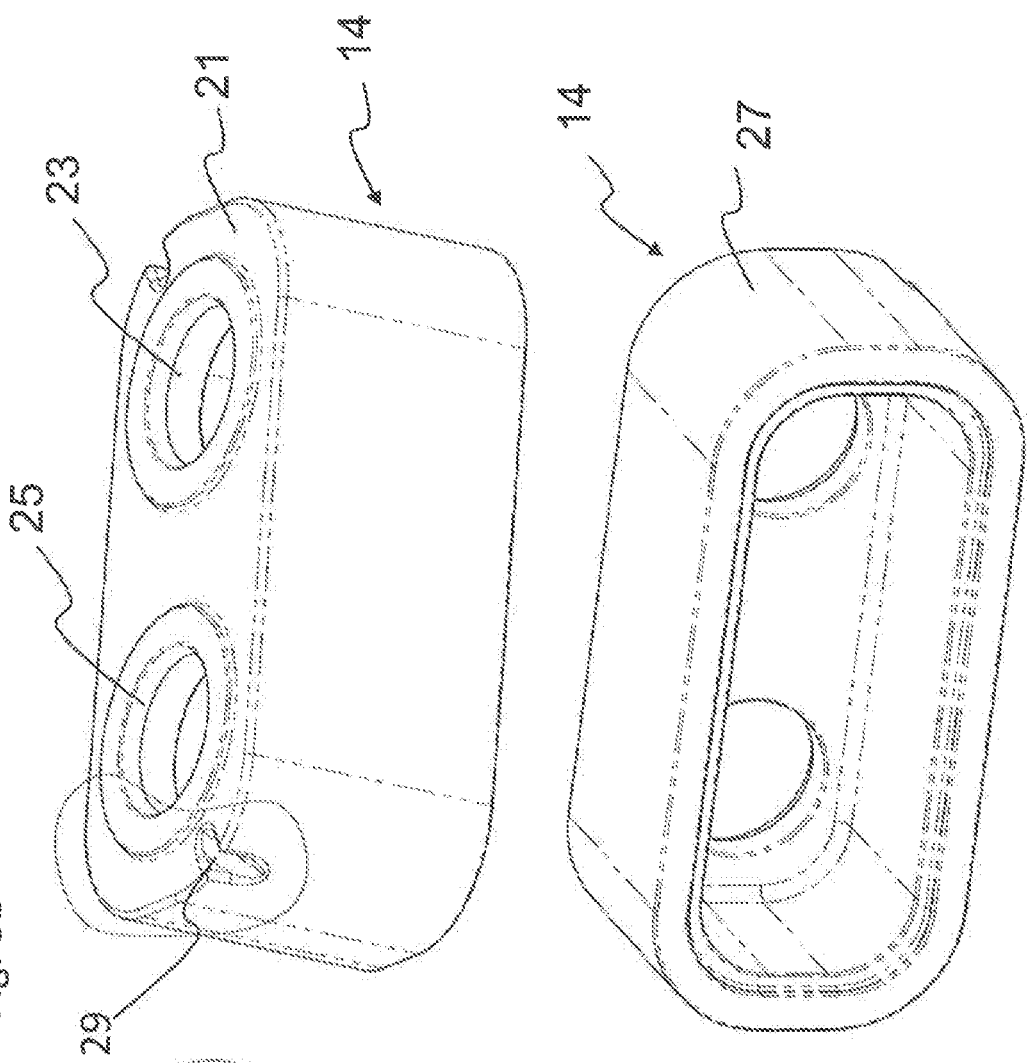

POWER CONTACTOR AND METHOD FOR PRODUCING A HOUSING BODY FOR THE POWER CONTACTOR

This patent application is a national phase filing under section 371 of PCT/EP2017/078441, filed Nov. 7, 2017, which claims the priority of German patent application 102016121345.4, filed Nov. 8, 2016, each of which is incorporated herein by reference in its entirety.

TECHNICAL FIELD

The present invention relates to a power contactor, as well as to a method for producing a housing body for the power contactor.

BACKGROUND

Power contactors are electrically-operated, remotely-operable switches. They have a control power circuit which can switch a load circuit on and off.

One possible use of power contactors is the opening and interrupting of battery current circuits in electric motor vehicles. In this case the positive contact, as well as the negative contact of a battery, are normally interrupted with the aid of a power contactor. The interruption occurs in the resting state of the vehicle and in the event of an incident, for example, an accident. In this case, the main object of the power contactor is to switch the vehicle to a zero-potential state and to interrupt the current flow.

Due to transfer resistances within the power contactor, the power contactor heats up. An excessive heating can lead to a damaging and, ultimately, to a failure of the power contactor.

Usually, a suitable design of the power contactor, of feed lines and of fastening means are carried out, so that an excessive heating cannot occur during the normal operation. However, incidents can occur which cannot be compensated by means of such a design; for example, higher transfer resistances can occur in the interior of the power contactor due to deterioration, which resistances can, already for low currents, lead to high heating. Such defects cannot be identified from outside.

SUMMARY OF THE INVENTION

Embodiments provide a power contactor, with an increased reliability, in particular with an increased reliability by avoiding functional failures of the power contactor due to overheating. Further embodiments provide a method for producing a housing body for the power contactor which makes a cost-effective production of the power contactor possible.

According to a first aspect of the invention, a power contactor comprises a first electrical contact and a second electrical contact. The power contactor comprises a switch element which can take an opened position and a closed position, wherein the switch element, in the closed position, contacts the first electrical contact and the second electrical contact with one another, and wherein the first electrical contact and the second electrical contact are insulated from one another if the switch element is in the opened position. The power contactor further comprises at least one temperature sensor integrated in the power contactor, which sensor is configured for detecting a temperature of the power contactor in a pre-defined distance from the first electrical contact and/or the second electrical contact.

The integration of the temperature sensor into the power contactor has the advantage that an absolute temperature of the power contactor can also be detected or established, since a geometry and an inner structure of the power contactor are unchanged, and, by means of a calibration of a temperature output of the temperature sensor, an actual terminal temperature can be inferred.

Due to the integration of the temperature sensor into the power contactor, the temperature sensor and the power contactor form a single, functional unit. They can be fabricated together and be matched to one another. This way, the temperature sensor can thus be calibrated in such a manner that the specific temperature behavior of the power contactor can be taken into account. Further, the mounting of the power contactor and of the temperature sensor, for example, in a battery disconnect unit, is significantly simplified, as these components can now be jointly mounted as a unit.

The temperature sensor can be referred to as integrated into the power contactor if the power contactor and the temperature sensor are arranged in direct spatial proximity to one another. In particular, the power contactor and the temperature sensor can be enclosed by a common housing and/or can be arranged in a common housing. It is thus not required that the temperature sensor is arranged or fastened outside on the housing and/or on one or multiple outer contacts of the power contactor.

The power contactor and the temperature sensor can be manufactured together. The power contactor and the temperature sensor can be delivered to a user as a common unit. Due to the high degree of integration, hardly any additional construction space is needed for the temperature sensor. The power contactor with the integrated temperature sensor can thereby in particular be advantageous in applications in which only very limited space is available.

Preferably, the pre-defined distance is selected such that a time duration for a heat diffusion from the electrical contact (s) does not exceed a pre-defined duration and/or that a heat dissipation, for example, to the environment, is small, i.e., does not exceed a predetermined threshold, and/or the heat dissipation can be determined with a pre-defined exactness and can be taken into account due to a calibration.

In an advantageous configuration according to the first aspect, the power contactor comprises a contact chamber device with a housing body and a contact chamber. The switch element is at least partly arranged in the contact chamber. The housing body at least partly encloses the contact chamber, and the temperature sensor is arranged in the housing body. This has the advantage that the temperature sensor is arranged in the vicinity of the heat sources, in particular in the vicinity of the electrical contacts. The temperature of the power contactor can be measured with a small delay time. The decreasing of the delay times has the further advantage that a regulating of the power contactor depending on the temperature can be simplified. In particular, a contact bridge of the switch element is arranged in the contact chamber.

In a further advantageous configuration according to the first aspect, the housing body comprises a ceramic material or consists of a ceramic material. The housing body thus advantageously has a high temperature stability and very good electrical insulating properties. The temperature sensor is separated from a potential that is applied to the terminals of the power contactor, in that the temperature sensor is incorporated into the ceramic housing body.

In a further advantageous configuration according to the first aspect, the housing body comprises a recess, and the temperature sensor is arranged in the recess.

In a further advantageous configuration according to the first aspect, the housing body of the contact chamber device comprises a bottom wall, and the recess is arranged in the bottom wall. Here, the bottom wall comprises a first opening through which the first electrical contact is guided, and a second opening through which the second electrical contact is guided. The arrangement of the recess in the bottom wall advantageously makes it possible to arrange the temperature sensor in the vicinity of the terminals, and nonetheless to ensure a good electrical insulation of the temperature sensor with respect to the electrical contacts of the power contactor.

In a further advantageous configuration according to the first aspect, the housing body of the contact chamber device comprises a lateral wall, and the recess is arranged in the lateral wall of the housing body. The arrangement of the recess in the lateral wall advantageously makes it possible to arrange the temperature sensor in direct vicinity, in particular in the vicinity of the electrical contacts, of the heat source, and nonetheless to ensure a good electrical insulation of the temperature sensor from the electrical contacts of the power contactor.

In a further advantageous configuration according to the first aspect, the housing body of the contact chamber device comprises a lateral wall and a bottom wall. The recess is arranged in an edge region in which the bottom wall and the lateral wall meet. The bottom wall comprises a first opening, through which the first electrical contact is guided, and a second opening, through which the second electrical contact is guided. The arrangement of the recess in the edge region advantageously makes the arranging of the temperature sensor in direct vicinity of the heat source possible, for one, and nonetheless ensures a good electrical insulation of the electrical sensor with respect to the electrical contacts of the power contactor. In addition, the arrangement of the recess in the edge region makes a cost-effective production of the housing body and a simple fastening of the temperature sensor possible. In particular, such an arrangement makes a simplified and reliable production of a ceramic green body for the housing body possible, in particular when using a dry-pressing for the production of the ceramic green body.

In a further advantageous configuration according to the first aspect, the recess is formed as a prism-shaped depression with a triangle-shaped base surface. This makes a cost-effective production of the housing body and a simple fastening of the temperature sensor possible. In particular, such an arrangement makes a simplified and reliable production of a ceramic green body for the housing possible, in particular when using a dry-pressing for the production of the ceramic green body. The recess can be configured in a very simple and precise manner.

In another advantageous configuration, the temperature sensor is fastened to the housing body by means of an adhesive which has a same or similar thermal expansion coefficient as the housing body and is therefore adapted to a thermal expansion of the housing body. This has the advantage that thermal stresses can be avoided or at least reduced, and therefore a reliability of the connection between the temperature sensor and the housing body can be increased.

According to a second aspect of the invention, a method for producing a housing body for a contact chamber device of a power contactor according to the first aspect is provided. Here, a housing body green body for the contact chamber device is produced by means of dry-pressing of a ceramic powder, and the housing body green body already comprises the recess for receiving the temperature sensor. The housing body green body is subsequently sintered. This means that a negative press mold for the housing body is configured, in particular comprises an elevation, such that the recess is formed in the housing body green body during the production step of the dry-pressing and does not have to be formed in a further production step. Advantageously, this makes it possible to produce the power contactor with the temperature sensor, in particular the housing body for the power contactor, in a cost-effective manner.

BRIEF DESCRIPTION OF THE DRAWINGS

Exemplary embodiments of the invention are explained in the following by means of the schematic drawings.

FIGS. 3a to 3c each show a perspective view of an exemplary embodiment of the housing body of the contact chamber device.

Elements of identical construction or function are denoted with the same reference characters throughout the Figures.

DETAILED DESCRIPTION OF ILLUSTRATIVE EMBODIMENTS

Figure 1:
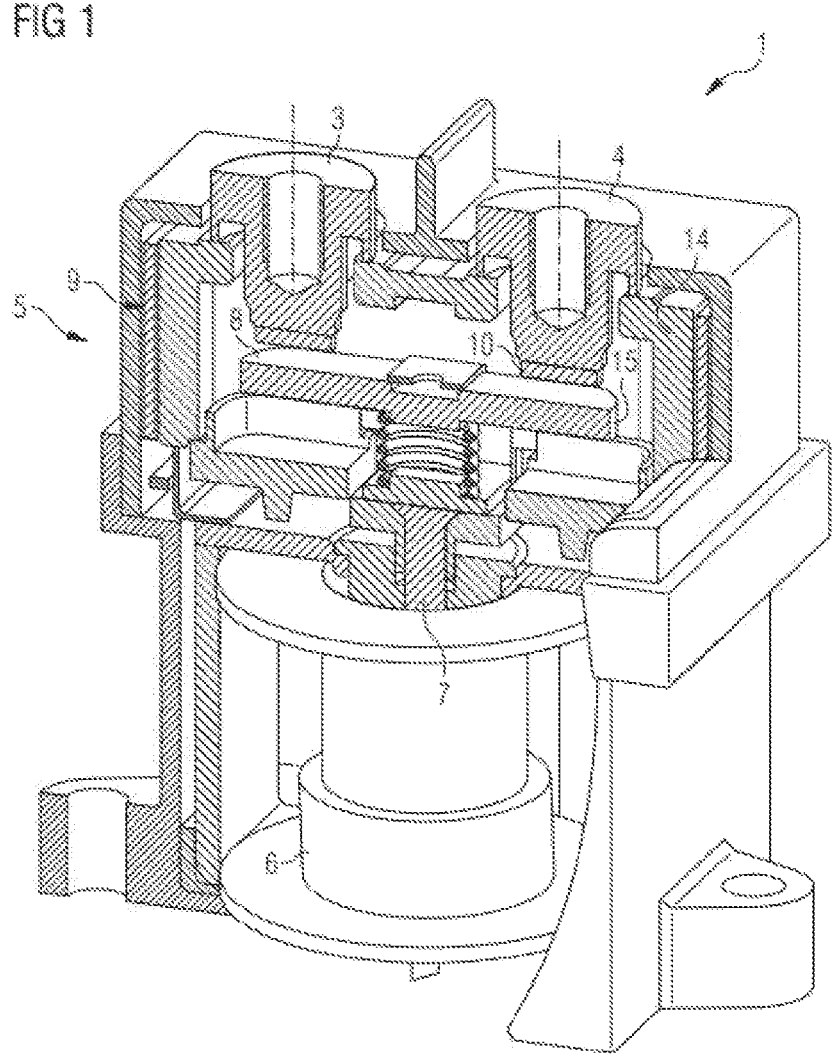
FIG. 1 shows an exemplary embodiment of a power contactor.

FIG. 1 shows an exemplary embodiment of a power contactor.

The power contactor 1 comprises a switch element 5 and a contact chamber device 9. The switch element 5 comprises, for example, a magnetic drive with a least one coil 6 and a plunger 7, which is arranged in the at least one coil 6, as well as a movable contact bridge 8. The coil 6 can be applied, from outside, with a voltage in order to generate a magnetic field in the plunger 7, whereby the plunger 7 is axially movable along its longitudinal axis in the direction of the contact chamber device 9. The coil 6 and the plunger 7 are preferably arranged within a magnetizable yoke.

The contact chamber device 9 comprises a first electrical contact 3, a second electrical contact 4, a housing body 14 and a contact chamber 15.

The switch element 5, in particular the plunger 7, is arranged and configured to switch, depending of an energization of the coil 6, the contact bridge 8 of the contact chamber device 9 between a first position, in which the contact bridge 8 conductively connects the first electrical contact 3 and the second electrical contact 4, and a second position, in which the first electrical contact 3 and the second electrical contact 4 are insulated. The first and second electrical contacts 3, 4 each comprise an inner contact 16, 17 and an outer contact 18, 19.

The power contactor 1 comprises multiple contact resistances, for example:

an inner contact resistance between inner contact surfaces 10 of the inner contacts 16, 17 and the moveable contact bridge 8 and/or a first outer contact resistance between one of the outer contacts 18, 19 and lines fastened thereto and/or washers and/or circlips and/or a second outer contact resistance between one of the outer contacts 18, 19, which is part of the power contactor 1, and a connecting line, for example, a copper rail.

Due to the contact resistances, the power contactor 1 heats due to the current feed in operation. An excessive heating can lead to a damaging and, ultimately, to the failure of the power contactor 1. The increase of the heat-up is, usually, taken into consideration by means of a suitable design of the power contactor 1 and its feed lines, as well as of the fastening technologies. Influences can occur from the outside, however. For example, a contact pressing force of a feed line on one of the outer contacts 18, 19 can be reduced due to vibrations, whereby a higher contact resistance can occur, which, even in case of low currents, can have a high heating as a result.

Further, the inner contact resistance can increase due to repeated switching-off under load and due to an accompanying burn-off of the inner contact surfaces 10. This effect is not discernible from outside.

Moreover, an additional heat-up can be caused by an improper fastening, for example, due to an outer improper fastening of a power cable to one of the outer contacts 18, 19 of the power contactor 1. The improper fastening can, for example, be caused by a too-small cable lug, the use of washers and/or a too-small line cross-section.

Since, in most cases, power contactors 1 have the purpose of securing, a reliable monitoring of the temperature of the power contactor 1 is at least desired.

The power contactor 1 comprises at least one integrated temperature sensor 12 to detect a temperature of the power contactor 1.

Figure 2:
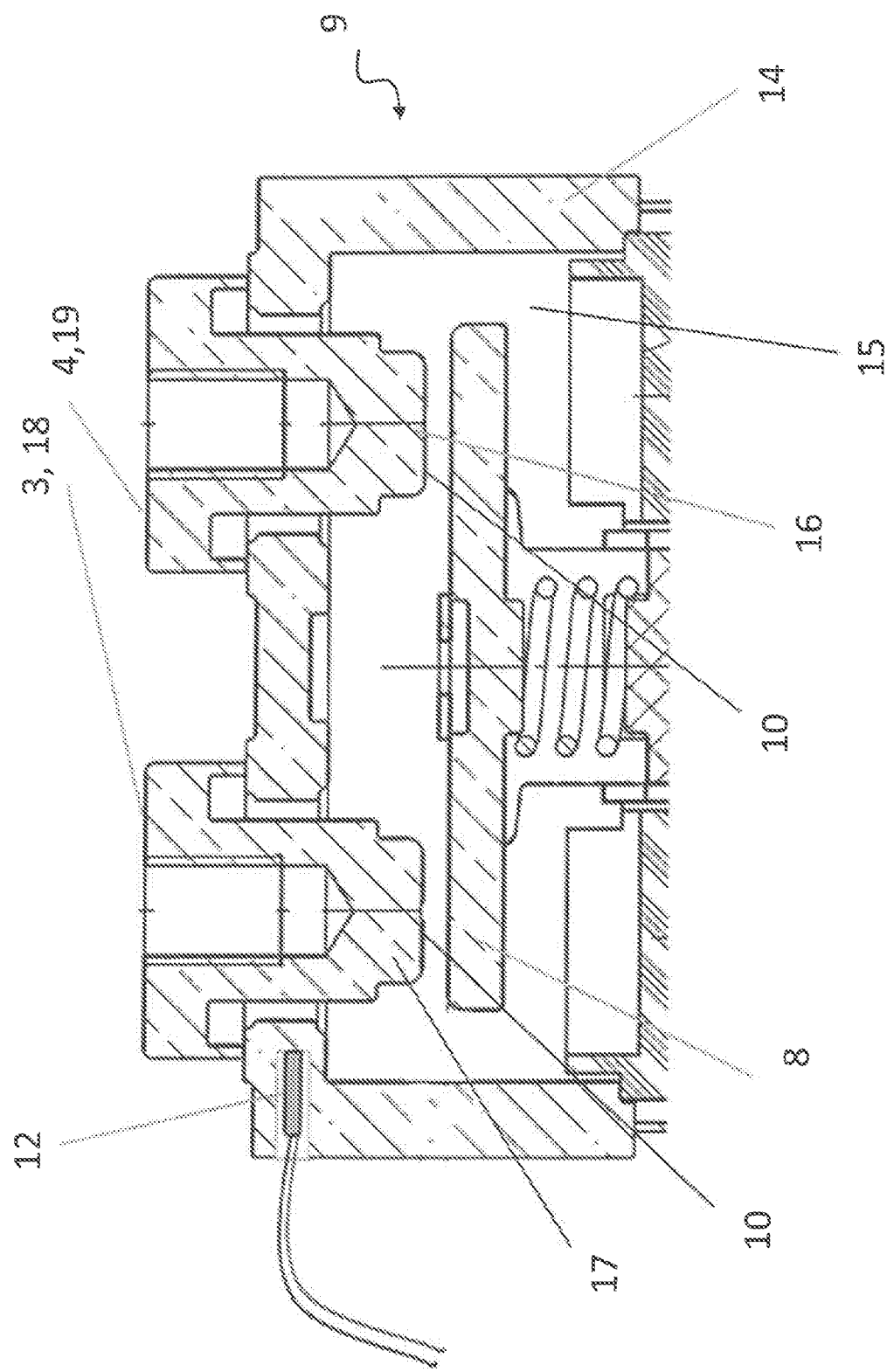
FIG. 2 shows a cross-sectional view of a contact chamber device of the power contactor.

FIG. 2 shows a cross-sectional view of the contact chamber device 9.

A gas is preferably located in the contact chamber 15 of the contact chamber device 9. The contact chamber device 9 comprises a housing body 14, which, for example, together with a lid, forms the contact chamber 15.

The housing body 14 roughly has the shape of a hollowed-out cuboid or of a "trough", for example, and is open on one side. The housing body 14 comprises a bottom wall 21 and a circumferential lateral wall 27, for example. The housing body 14 comprises or consists of a ceramic material, for example, a material based on titanium oxide or alumina. The housing body 14 is preferably produced by means of a dry-pressing method. The ceramic material has the advantage that is not susceptible to high temperatures and electric arc flame treatment, does not oxidize, and has good electrical insulation properties.

The housing body 14 has, along the opening, a circumferential bung, for example. The bottom wall 21 opposite to the opening of the housing body 14 of the contact chamber device 9 comprises a first opening 23 and a second opening 25, through which the first electrical contact 3 and the second electrical contact 4 are guided.

A temperature sensor 12 is integrated into the contact chamber device 9. For that, the housing body 14 preferably comprises a recess 29 for receiving the temperature sensor 12.

FIGS. 3a to 3c each show a perspective view of an exemplary embodiment of the housing body 14 of the contact chamber device 9, respectively.

The recess 29 is, for example, arranged in the bottom wall 21 or in the lateral wall 27. Alternatively, the recess 29 can be arranged in an edge region, in which the bottom wall 21 and the circumferential lateral wall 27 meet.

The recess 29, for example, comprises a prism-shaped depression with a triangle-shaped base surface.

The temperature sensor 12 is preferably fastened in the recess 29 of the housing body by means of gluing. For example, the temperature sensor 12 is fastened to the housing body by means of an adhesive, which has a same or similar thermal expansion coefficient as the material of the housing body and is thus adapted to the thermal expansion of the housing body. The housing body can, for example, have a thermal expansion coefficient which ranges from $5 \cdot 10^{-6}$ 1/K to $9 \cdot 10^{-6}$ 1/K, and the adhesive can, for example, have a thermal expansion coefficient which ranges from $2 \cdot 10^{-6}$ 1/K to $20 \cdot 10^{-6}$ 1/K.

The temperature sensor 12 has a resistance with a positive temperature coefficient, for example.

The invention claimed is:

1. A power contactor comprising:
   a first electrical contact;
   a second electrical contact;
   a switch element configured to provide an opened position and a closed position, wherein the switch element, in the closed position, contacts the first electrical contact and the second electrical contact with one another, and wherein the first electrical contact and the second electric contact are insulated from one another when the switch element is in the opened position;
   at least one temperature sensor integrated into the power contactor, wherein the sensor is configured to detect a temperature of the power contactor in a pre-defined distance from the first electrical contact and/or the second electrical contact; and
   a contact chamber device comprising a housing body and a contact chamber,
   wherein the switch element is at least partly arranged in the contact chamber,
   wherein the housing body at least partly encloses the contact chamber,
   wherein the housing body comprises a bottom wall with a first opening, through which the first electrical contact is guided, a second opening, through which the second electrical contact is guided, and a recess,
   wherein the recess is located at a distance from the first and second openings and is not part openings, and
   wherein the temperature sensor is arranged in the recess of the bottom wall.

2. The power contactor according to claim 1, wherein the housing body comprises a lateral wall, and wherein the recess is arranged in the lateral wall of the housing body.

3. The power contactor according to claim 1, wherein the housing body comprises a lateral wall, and wherein the recess is arranged in an edge region where the bottom wall and the lateral wall meet.

4. The power contactor according to claim 1, wherein the recess is formed as a prism-shaped depression with a triangle-shaped base surface.

5. The power contactor according to claim 1, wherein the temperature sensor is fastened to the housing body by an adhesive, the adhesive having the same or a similar thermal expansion coefficient as a material of the housing body.

6. The power contactor according to claim 1, wherein the housing body comprises a ceramic material.

7. A method for producing the housing body for the contact chamber device of the power contactor according to claim 6, the method comprising:
   producing a housing body green body for the contact chamber device by dry-pressing of the ceramic material, wherein the housing body green body already comprises the recess for receiving the temperature sensor; and
   subsequently sintering the housing body green body.

8. The method according to claim 7, wherein the recess is formed as a prism-shaped depression with a triangle-shaped base surface.

9. A method for producing the housing body for the contact chamber device of the power contactor according to claim 1, the method comprising:

producing a housing body green body for the contact chamber device by dry-pressing of a ceramic powder, wherein the housing body green body already comprises the recess for receiving the temperature sensor; and subsequently sintering the housing body green body.

10. The method according to claim 9, further comprising fastening the temperature sensor to the housing body by an adhesive, the adhesive having the same thermal expansion coefficient as a material of the housing body.

11. The method according to claim 9, further comprising fastening the temperature sensor to the housing body by an adhesive, the adhesive having a similar thermal expansion coefficient as a material of the housing body.

12. A power contactor comprising:
a first electrical contact;
a second electrical contact;
a switch element configured to provide an opened position and a closed position, wherein the switch element, in the closed position, contacts the first electrical contact and the second electrical contact with one another, and wherein the first electrical contact and the second electric contact are insulated from one another when the switch element is in the opened position;
at least one temperature sensor integrated into the power contactor, wherein the sensor is configured to detect a temperature of the power contactor in a pre-defined distance from the first electrical contact and/or the second electrical contact; and
a contact chamber device comprising a housing body and a contact chamber,
wherein the switch element is at least partly arranged in the contact chamber,
wherein the housing body at least partly encloses the contact chamber,
wherein the housing body comprises a bottom wall with a first opening, through which the first electrical contact is guided, a second opening, through which the second electrical contact is guided, and a recess,
wherein the recess is separate from and not connected to the first and second openings, and
wherein the temperature sensor is arranged in the recess and buried in the bottom wall.

13. The power contactor according to claim 12, wherein the housing body comprises a lateral wall, and wherein the recess is arranged in an edge region where the bottom wall and the lateral wall meet.

14. The power contactor according to claim 12, wherein the recess is formed as a prism-shaped depression with a triangle-shaped base surface.

15. The power contactor according to claim 12, wherein the temperature sensor is fastened to the bottom wall by an adhesive, the adhesive having the same or a similar thermal expansion coefficient as a material of the bottom wall.

16. The power contactor according to claim 12, wherein the housing body comprises a ceramic material.

\* \* \* \* \*

UNITED STATES PATENT AND TRADEMARK OFFICE
CERTIFICATE OF CORRECTION

| | |
|---|---|
| PATENT NO. | : 11,417,483 B2 |
| APPLICATION NO. | : 16/347162 |
| DATED | : August 16, 2022 |
| INVENTOR(S) | : Robert Hoffmann |

It is certified that error appears in the above-identified patent and that said Letters Patent is hereby corrected as shown below:

In the Claims

Claim 1, Column 6, Line 34; delete "and second openings and is not part openings" and insert --and second openings and is not part of the first and second openings--

Signed and Sealed this
Twentieth Day of September, 2022

*Katherine Kelly Vidal*
Katherine Kelly Vidal
*Director of the United States Patent and Trademark Office*